United States Patent
Chou

(10) Patent No.: US 9,174,589 B2
(45) Date of Patent: Nov. 3, 2015

(54) VEHICLE TRIM STRUCTURE WITH INTEGRALLY FORMED RIBS

(71) Applicant: TOYOTA MOTOR ENGINEERING & MANUFACTURING NORTH AMERICA, INC., Ann Arbor, MI (US)

(72) Inventor: Warren J. Chou, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 3 days.

(21) Appl. No.: 13/900,914

(22) Filed: May 23, 2013

(65) Prior Publication Data

US 2014/0346798 A1    Nov. 27, 2014

(51) Int. Cl.
*B60R 13/02* (2006.01)
*B60R 16/02* (2006.01)
*F16B 5/06* (2006.01)

(52) U.S. Cl.
CPC ......... *B60R 13/0206* (2013.01); *B60R 16/0215* (2013.01); *F16B 5/0635* (2013.01); *F16B 5/0664* (2013.01)

(58) Field of Classification Search
CPC   B60R 13/02; B60R 13/0206; B60R 16/0215; F16B 5/12; F16B 5/0635; F16B 5/0664
USPC ........................................................ 296/1.08
See application file for complete search history.

(56) References Cited

U.S. PATENT DOCUMENTS

2013/0099518 A1*   4/2013   Kwolek .................. 296/1.08

* cited by examiner

*Primary Examiner* — Glenn Dayoan
*Assistant Examiner* — Melissa A Black
(74) *Attorney, Agent, or Firm* — Frederick W. Mau, II

(57) ABSTRACT

A vehicle trim structure for attachment of a resilient clip includes a flange extending generally orthogonally from an interior wall of an automotive vehicle and a plurality of ribs protruding generally orthogonally from the flange. The flange includes a proximal end integral with the interior wall, a distal end separated from the interior wall, an interior face spanning between the proximal end and the distal end, and an exterior face spanning between the proximal end and the distal end, opposite the interior face. The plurality of ribs extends longitudinally from the proximal end of the flange to the distal end of the flange.

9 Claims, 1 Drawing Sheet

VEHICLE TRIM STRUCTURE WITH INTEGRALLY FORMED RIBS

TECHNICAL FIELD

The present disclosure generally relates to a vehicle trim structure adapted for clip attachment and, more specifically, to an automotive vehicle trim structure including a plurality of integrally-formed ribs to provide a more secure attachment for a resilient clip.

BACKGROUND

Modern vehicles use a variety of resilient clips to secure components to the body of the vehicle. In one particular application, resilient clips are used to secure wires or wire harnesses to protruding trim structures. However, in some cases, trim structures do not have the required thickness to ensure proper attachment of some resilient clips. Trim structures can be engineered to a greater thickness; however, certain drawbacks may result. For instance, additional materials will be used in the molding process and the possibility of molding defects increases.

Accordingly, a need exists for securing resilient clips to automotive trim components while reducing waste and the possibility of molding defects.

SUMMARY

A first aspect of a preferred embodiment of the present invention concerns a vehicle trim structure for attachment of a resilient clip. An exemplary vehicle trim structure includes a flange extending generally orthogonally from an interior wall of an automotive vehicle, the flange including a proximal end integral with the interior wall, a distal end separated from the interior wall, an interior face spanning between the proximal end and the distal end, and an exterior face spanning between the proximal end and the distal end, opposite the interior face; and a plurality of ribs, each rib in the plurality of ribs protruding generally orthogonally from the flange and extending longitudinally from the proximal end to the distal end.

A second aspect of a preferred embodiment of the present invention is related to a clip attachment system. An exemplary clip attachment system includes a resilient clip including a first engaging portion and a second engaging portion separated from the first engaging portion by an at-rest distance; and a vehicle trim structure including a flange having a far end, a near end, an interior face spanning between the far end and the near end, and an exterior face spanning between the far end and the near end, opposite the interior face, and a plurality of ribs, each rib in the plurality of ribs protruding generally orthogonally from the interior face of the flange and extending longitudinally from the far end to the near end, wherein the plurality of ribs and a portion of the exterior face opposite the plurality of ribs define a clip mounting area. Furthermore, the clip mounting area is disposed between the first engaging portion and the second engaging portion, one of the first engaging portion and second engaging portion is in contact with the plurality of ribs, and the first engaging portion and second engaging portion are separated by a distance greater than the at-rest distance.

A third aspect of a preferred embodiment of the present invention is related to an attachment point for a resilient clip. An exemplary attachment point includes a structure; a flange extending generally orthogonally from the structure, the flange including a proximal end integral with the structure, a distal end separated from the structure, an interior face spanning between the proximal end and the distal end, and an exterior face spanning between the proximal end and the distal end, opposite the interior face; and a plurality of ribs, each rib in the plurality of ribs protruding generally orthogonally from the interior face of the flange and extending longitudinally from the proximal end to the distal end.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Generally, a vehicle trim structure in accordance with one or more embodiments of the present invention comprises one or more mounting flanges secured to the interior of a vehicle body. At least one of the mounting flanges includes a plurality of integrally formed ribs defining a clip attachment area. The plurality of ribs increases the thickness of the mounting flange in the clip attachment area to ensure the secure placement of a resilient clip thereto.

Figure 1:
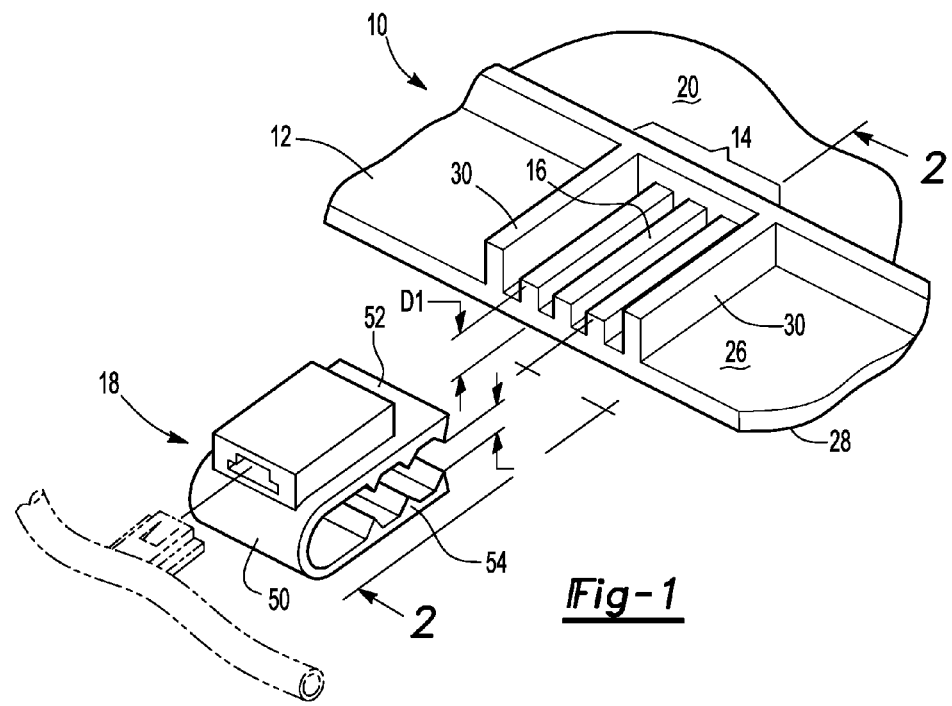
FIG. 1 is an isometric view of an embodiment of a vehicle trim structure including a mounting flange having a plurality of ribs defining a clip attachment area and a resilient clip.

FIG. 1 is an isometric view of a vehicle trim structure 10 in accordance with an embodiment of the present invention. The vehicle trim structure 10 may be situated at various locations within the interior of an automotive vehicle. The vehicle trim structure 10 includes one or more flanges 12. At least one flange 12 includes a plurality of ribs 16 protruding from a face of the flange 12 defining a clip mounting portion 14. The plurality of ribs 16 provides an increased thickness D1 in the clip attachment area 14. The clip attachment area 14 provides a convenient location to attach a resilient clip 18.

Referencing FIG. 1, one embodiment of a vehicle trim structure 10 is shown projecting from an interior wall 20 of an automotive vehicle. The vehicle trim structure 10 comprises one or more flanges 12 projecting outward from the interior wall 20 and oriented approximately orthogonal to the interior wall 20. The flange 12 includes a far edge proximal to the interior wall 20 and a near edge distal to the interior wall 20. The flange 12 includes an interior face 26 and an exterior face 28, opposite the interior face 26, each of the interior face 26 and exterior face 28 extending from the far edge to the near edge of the flange. The flange 12 further includes a plurality of ribs 16 protruding from the interior face 26. Each rib in the plurality of ribs 16 extends longitudinally along the interior face 26 of the flange 12. Each of the ribs project from the interior face 26 in a direction generally orthogonal to both the interior wall 20 and the interior face 26 of the flange 12. In an alternative embodiment, the plurality of ribs 16 may be disposed on the exterior face 28. In or more preferred embodiments, rib width may be calculated as a percentage of the flange thickness based on the injection mold material being used. For example, in one embodiment, the max rib width could be between 50% and 65% of flange thickness based on the material being injection molded. Limiting the maximum rib width may be beneficial to minimize surface defects or other molding defects.

The flange 12 may also include a pair of guide members 30. The pair of guide members 30 project from the interior face 26 and generally define the outer bounds of the clip attachment area 14 of the flange 12. The guide members 30 are situated on opposing sides of plurality of ribs 16 extend longitudinally along the interior face 26 of the flange 12, parallel with the plurality of ribs 16. The guide members 30 may be used to aid in positioning the resilient clip 18 over the plurality of ribs 16. The guide members 30 may also be used to prevent a resilient clip 18 positioned over the plurality of ribs 16 from sliding off the ribs in a direction transverse to ribs. In at least one alternative embodiment, only one guide member is included. In one or more embodiments, the height of each guide member 30 is greater than the height of each of the ribs 16. In at least one embodiment, the height of each guide member 30 is greater than the height of the resilient clip 18 so as to minimize risk of misattachment of the clip 18 to the clip attachment area 14.

Figure 2:
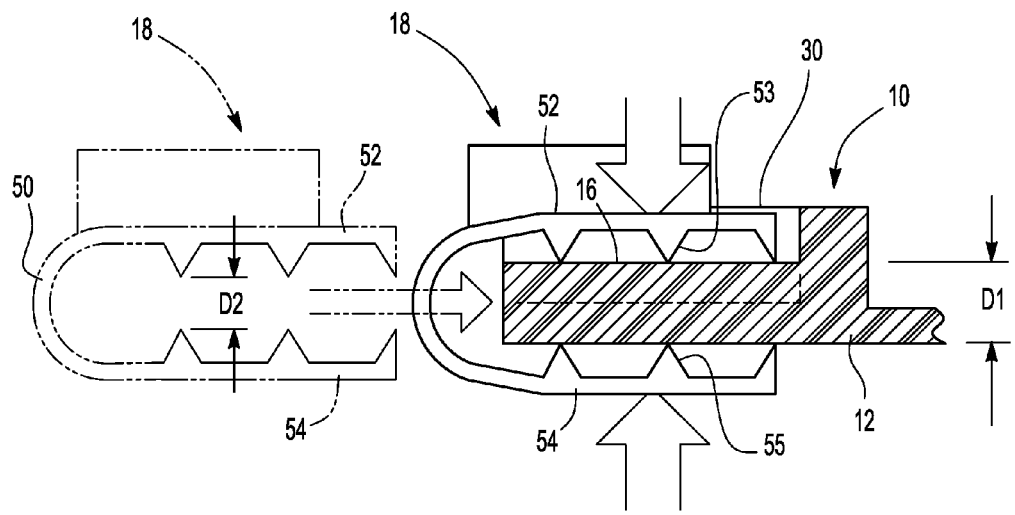
FIG. 2 is a cross-sectional view of the resilient clip of FIG. 1 attached to the vehicle trim structure of FIG. 1.

FIG. 1 further illustrates a resilient clip 18 adapted for installation to the clip attachment area 14. FIG. 2 is a cross-sectional view of the resilient clip 18 and flange 12 of FIG. 1 taken along line 2-2. Resilient clips 18 may include clips that require mechanical deformation to attach to a surface. Resilient clips 18 may also include clips or clamps having a first engaging portion and a second engaging portion, and wherein the first engaging portion and second engaging portion are capable of being biased toward one another. Examples of resilient clips include alligator clips, crocodile clips, spring clips, etc. Clips that require mechanical deformation to attach to a part.

As seen in FIGS. 1 and 2, a resilient clip 18 comprises a generally U-shaped clamp 50 made of a highly resilient material. A material with high resilience is capable of absorbing energy when it is deformed elastically and releasing that energy upon unloading. A U-shaped clamp 50 may have a first arm 52 acting at a first engaging portion and a second arm 54 acting as a second engaging portion. The first arm 52 may include a plurality of first protrusions 53 and the second arm 54 may include a plurality of second protrusions 55. The plurality of first protrusions 53 is formed on a surface of the first arm 52. The plurality of second protrusions 55 is formed on a surface of the second arm 52. The plurality of first protrusions 53 and the plurality of second protrusions 55 extend transversely to an extending direction of the plurality of ribs 16. In the absence of external forces, the first arm 52 and second arm 54 are separated by some at-rest distance D2. More specifically, in the absence of external forces, the plurality of first protrusions 53 and the plurality of second protrusions 55 are separated by some at-rest distance D2. As force is applied to the interior surface of the first arm 52 and the second arm 54, the first arm 52 and the second arm 54 deform elastically and are forced apart from one another. In reaction to the deformation, the resilience of the material making up the U-shaped clamp 50 produces a clamping force biasing the first arm 52 and second arm 54 toward one another.

As seen in FIG. 2, the U-shaped clamp 50 connects to the clip attachment area 14 by sliding the U-shaped clamp 50 around the flange 12, such that the clip attachment area 14 of the flange 12 is disposed between the first arm 52 and the second arm 54. If the attachment area 14 has a thickness D1 greater than the at-rest distance D2, a clamping force is produced. As the thickness D1 of the attachment area 14 increases, the clamping force exerted by the U-shaped clamp 50 increases until the material comprising the U-shaped clamp 50 reaches its yield strength, at which point the resilience of the U-shaped clamp 50 is compromised. Note that for some types of resilient clips, the at-rest distance D2 is negligible because the arms of the resilient clip while at rest are in contact with one another.

Thus, an important consideration in the use of a resilient clip 18 is the thickness D1 of the attachment point to which the resilient clip 18 is being attached. In some cases, if the thickness D1 is below the at-rest distance D2 of the resilient clip 18, there may not be enough biasing force in the resilient clip 18 to ensure the secure attachment of the resilient clip 18 to the attachment point 14.

To better accommodate resilient clips, vehicle trim structures can include flanges having an increased overall thickness. However, flanges of increased overall thickness require substantially more material to produce. Increasing the thickness of only the clip attachment area 14 of the flange 12 reduces the amount of material required to ensure secure attachment of a resilient clip 18. The necessary material can further be reduced by using a plurality of ribs 16 that provide alternating bands of greater thickness rather than increasing the thickness of the entire clip attachment area 14 of the flange 12.

This embodiment of the present invention also provides the benefit of reducing the risk of molding defects. Common defects in molded parts include sink marks and voids. A sink mark is a local surface depression. A void is a vacuum bubble in the core of a molded part. Sink marks and voids may be caused by localized shrinkage of a molded material at thick sections without sufficient compensation during the cooling process. Reducing the overall thickness of a molded part can reduce the incidence of sink marks and voids.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle trim structure for attachment of a resilient clip, comprising:
   a flange extending generally orthogonally from an interior wall of an automotive vehicle, the flange including a proximal end integral with the interior wall, a distal end separated from the interior wall, an interior face spanning between the proximal end and the distal end, and an exterior face spanning between the proximal end and the distal end, opposite the interior face; and
   a clip attachment area including a plurality of ribs, each rib in the plurality of ribs protruding generally orthogonally from the interior face of the flange and extending longitudinally from the proximal end to the distal end, the plurality of ribs being located on a portion of the flange;
   wherein the resilient clip is attached to the clip attachment area, the resilient clip including a first engaging portion and a second engaging portion whereby either the first engaging portion or the second engaging portion overlaps and contacts the plurality of ribs with the plurality of ribs being positioned between the first engaging portion and second engaging portion of the resilient clip.

2. The vehicle trim structure for attachment of a resilient clip of claim 1, further comprising a first guide member oriented generally parallel to the plurality of ribs and extending generally orthogonally from the interior face of the flange from the proximal end to the distal end, wherein the first guide member is located outboard of the plurality of ribs and a height of the first guide member is greater than a height of each of the ribs.

3. The vehicle trim structure for attachment of a resilient clip of claim 2, further comprising a second guide member oriented generally parallel to the plurality of ribs and extending generally orthogonally from the interior face of the flange from the proximal end to the distal end, wherein a height of the second guide member is greater than the height of each of the ribs, and wherein the plurality of ribs is disposed between the first guide member and the second guide member.

4. A clip attachment system, comprising:
 a resilient clip including a first engaging portion and a second engaging portion separated from the first engaging portion by an at-rest distance;
 a vehicle trim structure including a flange having a far end, a near end, an interior face spanning between the far end and the near end, and an exterior face spanning between the far end and the near end, opposite the interior face, and a plurality of ribs, each rib in the plurality of ribs protruding generally orthogonally from the interior face of the flange and extending longitudinally from the far end to the near end;
 wherein one of the first engaging portion and second engaging portion overlaps and is in contact with the plurality of ribs and the other of the first engaging portion and second engaging portion is in contact with the exterior face, and wherein the first engaging portion and second engaging portion are separated by a distance greater than the at-rest distance.

5. The clip attachment system of claim 4, wherein the plurality of ribs is disposed between a pair of guide members, wherein the pair of guide members defines outer bounds of a clip attachment area.

6. The clip attachment system of claim 4, wherein the resilient clip is an alligator clip.

7. The clip attachment system of claim 4, wherein the resilient clip is a U-shaped clamp.

8. The clip attachment system of claim 4, wherein the resilient clip is a spring clip.

9. A clip attachment system, comprising:
 a resilient clip including a first engaging portion and a second engaging portion, wherein a plurality of first protrusions is formed on a surface of the first engaging portion and a plurality of second protrusions is formed on a surface of the second engaging portion, the plurality of the second protrusions being separated from the plurality of first protrusions by an at-rest distance;
 a vehicle trim structure including a flange having a far end, a near end, an interior face spanning between the far end and the near end, and an exterior face spanning between the far end and the near end, opposite the interior face, and a plurality of ribs, each rib in the plurality of ribs protruding generally orthogonally from the interior face of the flange and extending longitudinally from the far end to the near end;
 wherein one of the plurality of first protrusions and the plurality of second protrusions is mounted on the plurality of ribs and the other of the plurality of first protrusions and the plurality of second protrusions is in contact with the exterior face, and wherein the plurality of first protrusions and the plurality of second protrusions are separated by a distance greater than the at-rest distance, and wherein the plurality of first protrusions and the plurality of second protrusions extend transversely to an extending direction of the plurality of ribs.

\* \* \* \* \*